Figure 1:
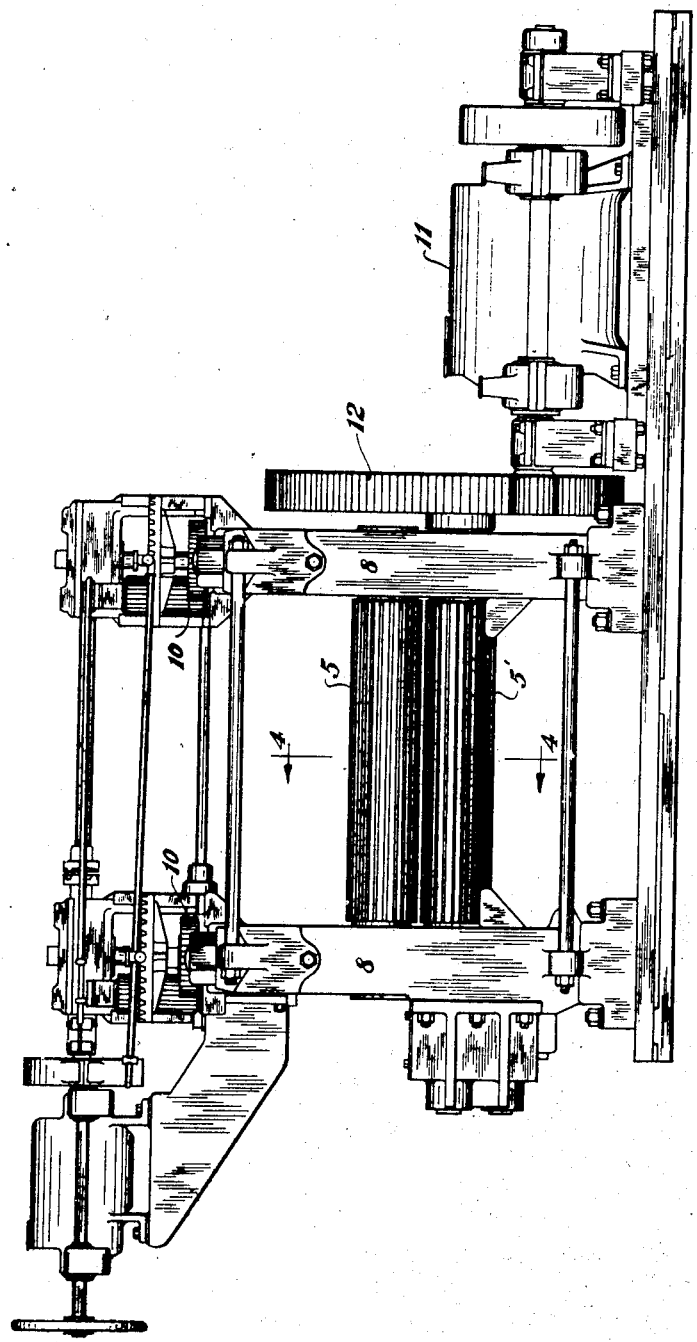

Inventors
H. M. Naugle
A. J. Townsend

June 18, 1929.  H. M. NAUGLE ET AL  1,718,064
SCALE BREAKER
Filed May 24, 1927  3 Sheets-Sheet 3

Inventors
H. M. Naugle
A. J. Townsend
By Frease and Boud
Attorneys

Patented June 18, 1929.

1,718,064

UNITED STATES PATENT OFFICE.

HARRY M. NAUGLE AND ARTHUR J. TOWNSEND, OF CANTON, OHIO, ASSIGNORS, BY MESNE ASSIGNMENTS, TO THE AMERICAN ROLLING MILL COMPANY, OF MIDDLETOWN, OHIO, A CORPORATION OF OHIO.

SCALE BREAKER.

Application filed May 24, 1927. Serial No. 193,938.

The invention relates to means for breaking the scale on the surface of a steel slab for removing the scale therefrom, as a step in the manufacture of stripsheets directly from the slab by roughing and hot rolling operations, which may be followed by continuous pickling, cold rolling and continuous annealing operations.

More particularly the invention relates to means for breaking the scale on very thick and very wide slabs from which stripsheets of more than ordinary width are made, that is to say, of widths exceeding from twenty to twenty-five inches, to which strip mill practice has heretofore been limited; it having been found that the means ordinarily employed for breaking and removing the scale from such thinner and narrower slabs are not effective when dealing with thicker and wider slabs.

The oxidation or scale which is formed upon the sides or faces of a slab by the action of gases while passing through a heating furnace, regardless of the type of furnace used, is harder and more tenacious than the oxidation or scale formed during subsequent mill operations, and it is sometimes so thick as to amount to one percent by weight of the steel in the slab, and it is necessary to remove this scale so as to leave an absolutely clean surface upon the slab before it is reduced to a stripsheet by the rolling action of roughing and hot mills.

The necessity of completely removing the scale so as to leave a perfectly clean surface, is because a mere speck of scale remaining on the surface will be so embedded in the body of the finished sheet as to cause a rejection for commercial use; and even though the embedded scale may be partially removed by a pickling operation, it will leave a deep pit which cannot be entirely eliminated by a cold rolling operation, and will cause a rejection of the finished sheet.

An ordinary method of breaking the scale upon narrower slabs is to compress the slab sidewise between lateral rolls operating upon the edges of the slab, which compresses the body of the steel but not the scale thereon, and thereby loosens the scale from the body. It is not possible, however, to remove the scale from the wider slabs which are now being used for the production of stripsheets, by an edge rolling thereof, because the compression of the body resulting therefrom extends only inward a distance of from ten to twelve inches in each side, and leaves the scale intact in the middle zone of the slab which is not affected by the compressing action.

An ordinary series of levelling rolls has been proposed for use in breaking the scale on a thin strip or sheet in advance of a continuous pickling operation, but the use of smooth rolls for the present purpose is not completely effective, no doubt because the thickness of the slab prevents such bending of the same in reverse directions as may serve to break and remove the scale in thinner strips and sheets, and also because the soft body of a hot slab adheres more closely to the scale than does the cold body of a strip or sheet.

The present invention therefore involves the use of an upper and lower series of rolls arranged in staggered relation so as to flex or bend the slab in reverse directions when passing between them, together with a pair of pinch rolls which may be preceded or succeeded by pairs of pinch rolls for positively driving or drawing the slab in a tortuous course between the scale breaking rolls.

For the purpose of the present invention, it is desirable if not necessary to provide a continuous circumferential series of deep grooves in the peripheries of all of the rolls, which grooves may be arranged longitudinally or spirally as may be desired, and should be so shaped as to form crushing teeth on each side of the grooves on the peripheral face of the roll. Cutting edges may also be formed on the protruding ends of studs or spikes on the periphery of the rolls.

These crushing teeth cooperate with the flexing or bending action of the rolls not only in loosening or detaching the scale from the body of the slab, but also in crushing and breaking or separating it into comparatively small pieces, which will readily drop away from the slab either by gravity or by the action of a turn-over machine or the blasting means sometimes used for removing scale from a slab.

An embodiment of the invention is illustrated in the accompanying drawings forming part hereof, in which—

Figure 2:
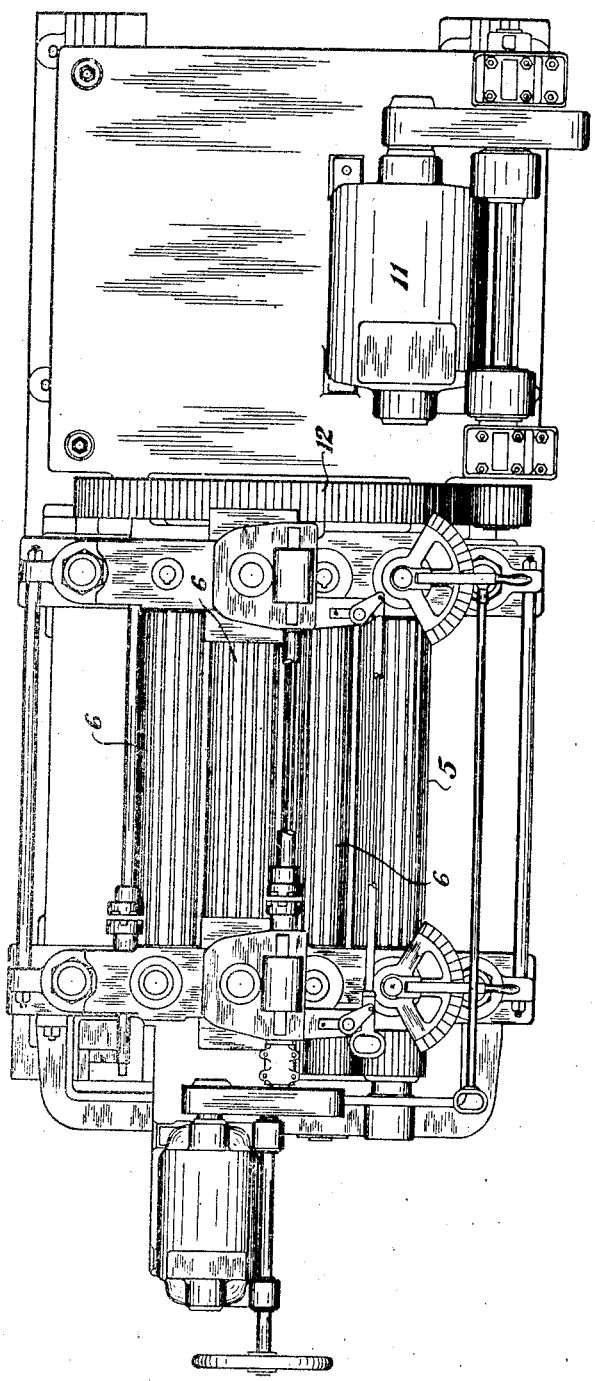

Figure 1 is a front elevation of the improved scale breaking machine;

Fig. 2, a plan view of the same;

Fig. 3, a right end elevation of the same; and

Figure 4:
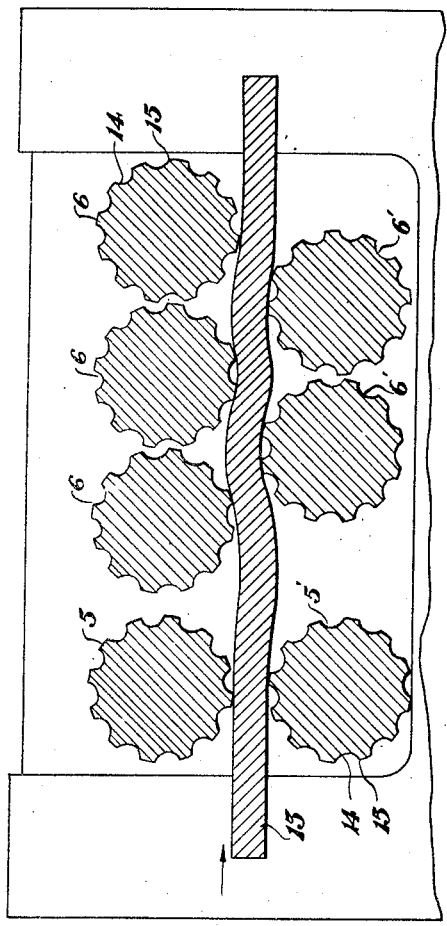
Figure 5:
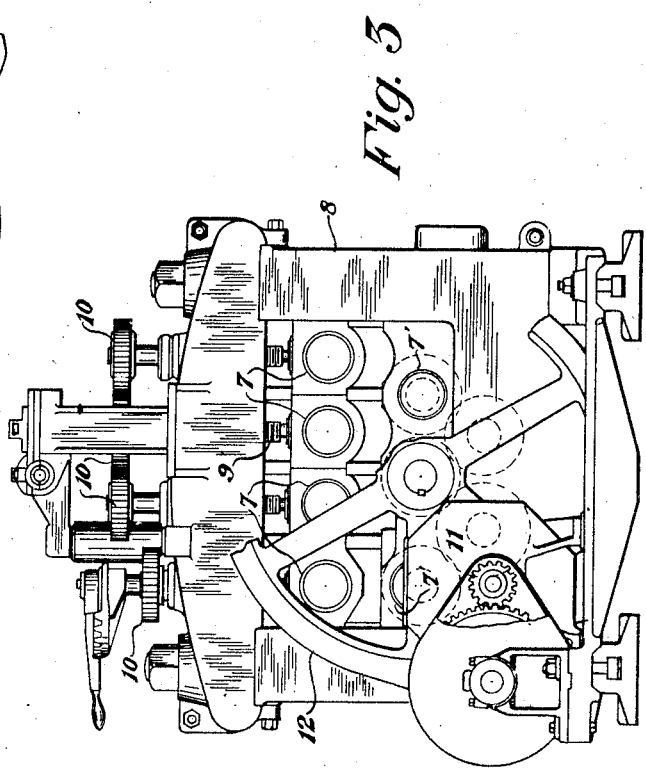

Fig. 4, an enlarged section as on line 4—4, Fig. 1, showing the action of the rolls upon a slab.

Similar numerals refer to similar parts throughout the drawings.

A pair of pinch rolls 5 and 5′ and an upper and lower series of scale breaking rolls 6, 6, 6 and 6′, 6′ have their ends journaled in suitable bearings 7 and 7′ mounted in a suitable frame or housing 8. The upper bearings 7 are preferably adjusted as by screws 9 and gears 10 to and from the lower bearings, so as to vary the distance of the upper rolls from the lower rolls.

The lower rolls are positively driven by a motor 11, operatively geared to a master wheel 12 secured to the end of the middle lower roll, which in turn is operatively geared with the lower pinch roll 5′ and the end lower roll 6′, so that the lower rolls are positively driven in unison.

The upper pinch roll 5 may be located directly above the lower pinch roll 5′ so as to feed and drive a slab 13 to pass between the upper and lower scale breaking rolls; and the upper scale breaking rolls 6 are staggered and so spaced with respect to the lower scale breaking rolls 6′ as to cause a slab to be flexed or bent reversely upward and downward to loosen and detach the thick hard scale from the comparatively soft body of the metal, the operation being illustrated in Fig. 4 of the drawings.

A continuous series of grooves 14 is provided in the periphery of each roll, which grooves may extend longitudinally of the roll, and the edges 15 thereof are preferably formed sharp enough to cut into the thick scale and break it into short small pieces as it is detached from the body of the slab, so as to more readily separate therefrom.

By these means the hard, thick and tenacious scale which is formed on the slab in the heating furnace, is so detached from the slab and cut or broken into pieces, that it will readily fall away therefrom either by gravity or other means usually employed for removing loose scale from a slab.

We claim:—

1. A slab scale breaker including upper and lower series of rolls arranged in staggered relation for reversely bending the slab to loosen the scale therefrom and provided with peripheral crushing teeth for crushing the scale into small pieces.

2. A slab scale breaker including upper and lower series of rolls arranged in staggered relation for reversely bending the slab for loosening the scale therefrom and provided with peripheral crushing teeth for crushing the scale into small pieces, and pinch rolls for passing the slab between the bending rolls.

3. A slab scale breaker including upper and lower series of rolls arrange in staggered relation for reversely bending the slab for loosening the scale therefrom, pinch rolls for passing a slab between the bending rolls, all of the rolls being provided with peripheral crushing teeth for crushing the scale into small pieces.

HARRY M. NAUGLE.
ARTHUR J. TOWNSEND.